United States Patent Office 3,667,796
Patented June 6, 1972

3,667,796
LOGGING GRAPPLE
Welker W. Funk, Selma, Calif., assignor to Deere & Company, Moline, Ill.
Filed Oct. 30, 1970, Ser. No. 85,367
Int. Cl. B66c 1/10
U.S. Cl. 294—88
16 Claims

ABSTRACT OF THE DISCLOSURE

A pair of opposed arcuate tongs of a logging grapple are respectively pivoted to a pair of links, which are, in turn, pivoted to a yoke. A rotary fluid motor is supported on the yoke and is connected thereto to rotate the same through 360°. A hydraulic actuator has opposite ends pivotally connected to the tongs. Interconnecting the pair of links is a first cross-connected link and interconnecting the tongs are second and third cross-connected links, which respectively cause the pair of links and the tongs to move symmetrically upon extension and retraction of the hydraulic actuator. The various pivot points are selected such that the second and third cross-connected links cooperate with the tongs to grip logs when the actuator is extended. Also, the tong and linkage arrangement is designed so as to make it possible to pick up large bundles of logs as well as single small logs.

BACKGROUND OF THE INVENTION

The present invention relates to a grapple and more particularly relates to a logging grapple.

Log grapples ordinarily include a pair of tongs or jaws, which are hydraulically- or cable-operated into grasping relation to a log or a bunch of logs. Occasionally, when the log or the bunch of logs is too small, the tongs of conventional grapples will not grasp the logs securely enough to prevent them from slipping out of the grapple. Also, the tongs of some grapples are not closed symmetrically, and as a result logs sometimes are arranged such that they are in effect only gripped by one tong, and, if their arrangement suddenly shifts, one or more of the logs may slip free before the other tong comes to bear.

SUMMARY OF THE INVENTION

According to the present invention, there is provided a novel log grapple, and more particularly there is provided a log grapple especially suited for grasping single small logs or relatively large bunches of logs.

It is an object of the invention to provide a grapple which is simply and compactly constructed.

Another object is to provide a grapple wherein the tongs are closed symmetrically by equal amounts of force.

Still another object is to provide a grapple wherein a single hydraulic actuator is used to operate the tongs.

Yet another object is to provide a grapple having cross-links for transmitting equal operating forces to the tongs.

A further object is to provide a pair of cross-links, which cooperate with the tongs to grasp a log or a bunch of logs.

These and other objects will be apparent from the ensuing description and appended drawings.

BRIEF DESCRIPTION OF THE DRAWINGS

FIG. 3 is a partial right side view of the grapple shown in FIG. 1.

DESCRIPTION OF THE PREFERRED EMBODIMENT

Figure 1:
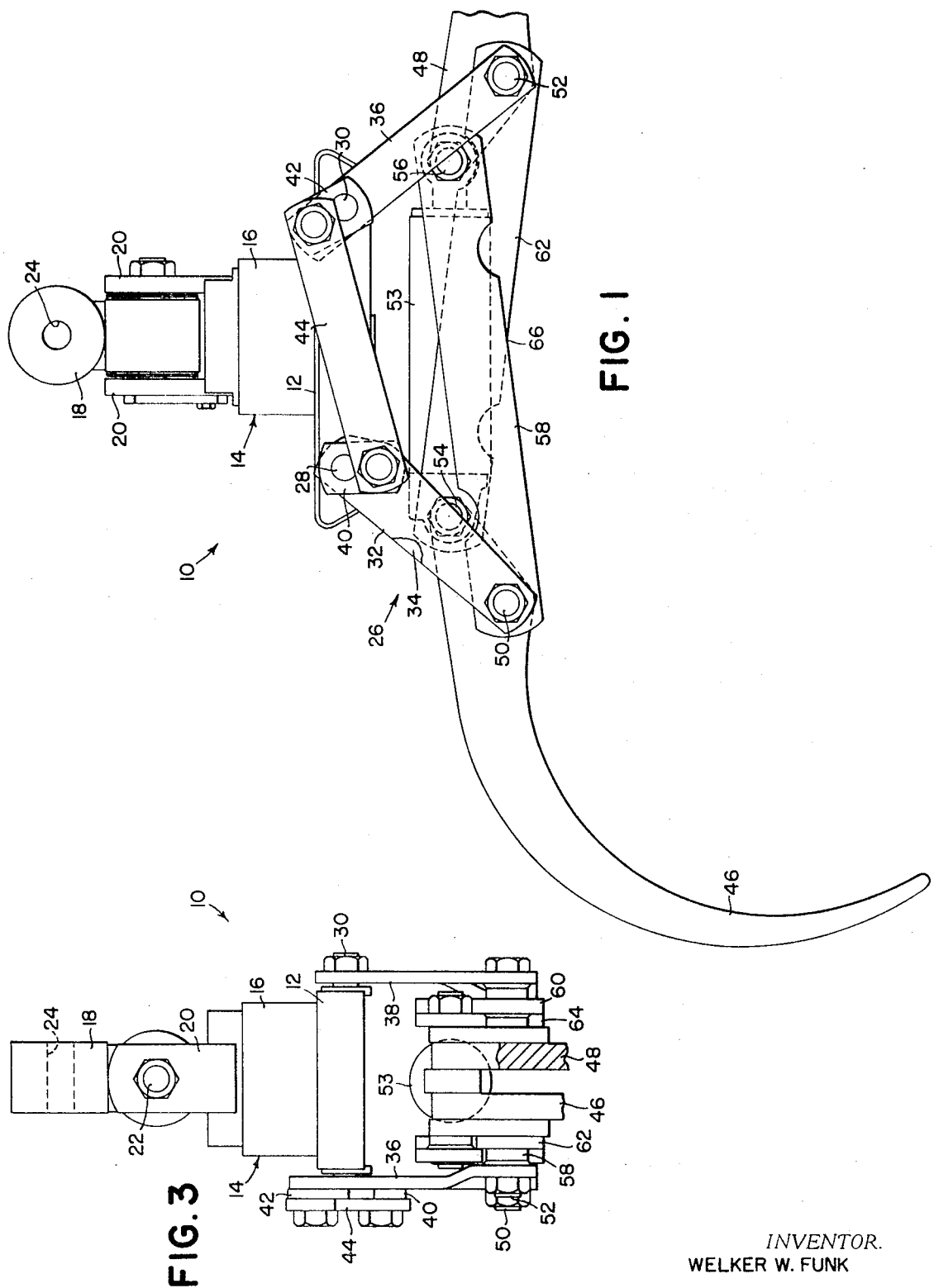
FIG. 1 is a front elevational view of a grapple shown in the condition wherein the tongs are open.
Figure 2:
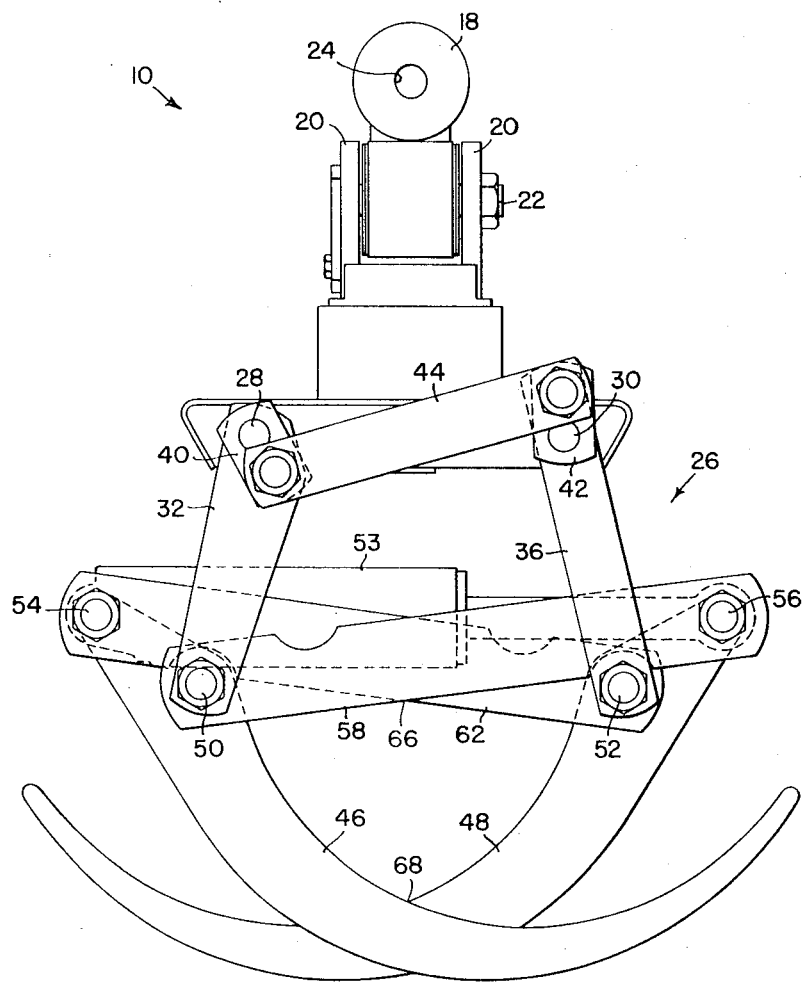
FIG. 2 is a view similar to FIG. 1 but showing the tongs closed.

Referring now to the drawings, there is shown a logging grapple designated in its entirety by the numeral 10. The grapple 10 includes a yoke or frame 12, which is suspended from a hydraulic rotary motor assembly 14. The motor assembly 14 includes a central post 16 about which the yoke 12 may be rotatably driven through 360° in a manner well known in the art. An articulated connection is provided for securing the yoke 12 to the end of a boom (not shown). The connection includes a pivot block 18, which, as viewed in FIGS. 1 and 2, is received between spaced lugs 20 fixed to the post 16 and connected to the lugs 20 by a laterally extending, horizontal pivot pin 22 about which the yoke 12 may pivot fore-and-aft. A bore 24 is located in the block 18 above the pivot pin 22 and is adapted to receive a pivot pin (not shown), for attaching the block 18 to the boom, and, about which the yoke 12 may pivot sideways.

Depending from the yoke 12 is a tong assembly 26 including a pair of laterally spaced fore-and-aft extending pivot pins 28 and 30 extending through the yoke 12. Mounted adjacent their upper ends on the opposite ends of the pin 28 are a pair of parallel links 32 and 34, and mounted adjacent their upper ends on the opposite ends of the pin 30 are a pair of parallel links 36 and 38. Secured for respectively pivoting with the links 32 and 36 are a pair of lugs or ears 40 and 42, which respectively project downwardly and upwardly relative to the pivot pins 28 and 30 and are interconnected by a link 44. A pair of opposed arcuate tongs 46 and 48 are respectively received between and pivoted to the lower ends of the pairs of links 32, 34 and 36, 38 by means of pins 50 and 52, which are received in the tongs at locations spaced slightly below their upper ends. An extensible and retractable hydraulic motor 53 is pivotally interconnected between the upper ends of the tongs 46 and 48 by means of a pair pins 54 and 56 and is operative upon extension to swing the tongs toward each other to the position illustrated in FIG. 2, it being noted that the tongs are offset from each other sufficiently to permit them to overlap as illustrated. Retraction of the motor 53 will of course cause the tongs to swing away from each other to the position illustrated in FIG. 1.

In order that the motor 53 will transfer equal force and motion to the tongs 46 and 48, a first pair of parallel links 58 and 60 straddle the motor and have their opposite ends pivotally connected to the pins 50 and 56, and a second pair of parallel links 62 and 64 straddle the motor, inside of the links 58 and 60, and have their opposite ends pivotally connected to the pins 52 and 54. Thus, it can be seen that the pairs of crossed links 58, 60 and 62, 64 are advantageously positioned to protect the motor 52.

It should also be noted that the pairs of crossed links 58, 60 and 62, 64 cooperate with the tongs 46 and 48 to either clamp one or a plurality of logs since crossing points 66 and 68 respectively of the links and tongs move toward each other as the tongs are closed and are located only a small distance from each other when the tongs are completely closed.

What is claimed is:

1. A grapple assembly comprising: a yoke; first and second tongs located to one side of said yoke; first and second fixed length link means providing the sole connection between said yoke and tongs and being respectively pivotally interconnected solely between a fixed location on said yoke and said first and second tongs for suspending said tongs from said yoke for movement between a spread apart first position and a grappling second position; and extensible and retractable means having opposite ends pivotally connected respectively to said first and second tongs at locations spaced from the respective connections of said tongs with said link means whereby said tongs are moved from said first to said second position by one of the extension and retraction movements of said extensible and retractable means.

2. The invention defined in claim 1 and further including third and fourth link means cross connected between said tongs at locations so spaced, relative to the points of connections of said extensible and retractable means and of said first and second link means with said first and second tongs, that they cause said tongs to be swung symmetrically by said extensible and retractable means.

3. The invention defined in claim 2 wherein one of the ends of each of said third and fourth link means shares a pivot point with said extensible and retractable means.

4. The invention defined in claim 2 wherein one of the ends of each of said third and fourth link means shares a pivot point respectively with said first and second link means.

5. The invention defined in claim 2 wherein the opposite ends of each of said third and fourth link means are respectively connected to the pivot points of said first and second link means and of said extensible and retractable means with said tongs.

6. The invention defined in claim 2 wherein said third and fourth link means each includes a pair of parallel links disposed on opposite sides of said extensible and retractable means and wherein each pair of parallel links includes edge portions positioned for cooperating with said tongs to hold a load in the tongs when the latter are in said second position.

7. The invention defined in claim 3 wherein said third and fourth link means each includes a pair of parallel links disposed on opposite sides of said extensible and retractable means and wherein each pair of parallel links includes edge portions positioned for cooperating with said tongs to hold a load in the tongs when the latter are in said second position.

8. The invention defined in claim 4 wherein said third and fourth link means each includes a pair of parallel links disposed on opposite sides of said extensible and retractable means and wherein each pair of parallel links includes edge portions positioned for cooperating with said tongs to hold a load in the tongs when the latter are in said second position.

9. The invention defined in claim 5 wherein said third and fourth link means each includes a pair of parallel links disposed on opposite sides of said extensible and retractable means and wherein each pair of parallel links includes edge portions positioned for cooperating with said tongs to hold a load in the tongs when the latter are in said second position.

10. A grapple assembly comprising: a yoke; first and second tongs located to one side of said yoke and each tong having one end adjacent to and one end remote from said yoke; said tongs being opposed to each other and mounted for movement towards and away from each other by structure including first and second fixed length link means providing the sole interconnection between said yoke and tongs and being respectively pivotally interconnected solely between a fixed location on said yoke and said adjacent ends of first and second tongs; and extensible and retractable means pivotally interconnected between said adjacent ends of said first and second tongs at locations respectively spaced along the tongs from the pivotal connection of said first and second link means with the tongs where upon actuation of said extensible and retractable means, said tongs are pivoted towards and away from each other about their respective pivotal connections with said first and second links.

11. The invention defined in claim 10 and further including third and fourth link means pivotally interconnected between said tongs, said third link means extending between the pivotal connections of the first link means with the first tong and the extensible and retractable means with the second tong and said fourth link means extending between the pivotal connections of the second link means with the second tong and the extensible and retractable means with the first tong.

12. The invention defined in claim 11 wherein said first, second, third and fourth link means each includes a pair of parallel links disposed on opposite sides of said extensible and retractable means in locations protecting the extensible and retractable means.

13. The invention defined in claim 10 wherein said first and second link means are pivoted at spaced locations on said yoke and each includes crank portions extending oppositely from the pivot connections with the yoke; and a link being pivotally interconnected between said crank portions.

14. The invention defined in claim 11 wherein said first and second link means are pivoted at spaced locations on said yoke and each includes crank portions extending oppositely from the pivot connections with the yoke; and a link being pivotally interconnected between said crank portions.

15. The invention defined in claim 12 wherein said first and second link means are pivoted at spaced locations on said yoke and each includes crank portions extending oppositely from the pivot connections with the yoke; and a link being pivotally interconnected between said crank portions.

16. The invention defined in claim 11 wherein the portions of the tongs including said remote ends are offset normal to the paths of swinging of the tongs to permit overlapping of the tongs when they are swung toward each other and said third and fourth link means being positioned to cooperate with said tongs to, as viewed in the direction normal to the paths of swinging of the tongs, enclose an ever decreasing area as said tongs are moved to positions of greater overlap.

References Cited
UNITED STATES PATENTS

| | | | |
|---|---|---|---|
| 2,857,193 | 10/1958 | Heppenstall | 294—106 |
| 3,039,812 | 6/1962 | Nimeskern | 294—88 |
| 3,164,406 | 1/1965 | Barry | 294—110 |
| 3,410,431 | 11/1968 | Vik | 294—88 |

EVON C. BLUNK, Primary Examiner

I. K. SILVERMAN, Assistant Examiner